(12) United States Patent
Masse et al.

(10) Patent No.: US 8,536,515 B2
(45) Date of Patent: Sep. 17, 2013

(54) METHOD FOR DETERMINING A DOSE OF RADIATION AND METHOD FOR DETERMINING AN ASSOCIATED ISODOSE CURVE

(75) Inventors: Véronique Masse, Voisins le Bretonneux (FR); Maurice Chiron, Quincy-Voisins (FR)

(73) Assignee: Commissariat a l'Energie Atomique et aux Energies Alternatives, Paris (FR)

(*) Notice: Subject to any disclaimer, the term of this patent is extended or adjusted under 35 U.S.C. 154(b) by 475 days.

(21) Appl. No.: 12/739,141

(22) PCT Filed: Oct. 20, 2008

(86) PCT No.: PCT/EP2008/064093
§ 371 (c)(1),
(2), (4) Date: Jun. 21, 2010

(87) PCT Pub. No.: WO2009/053324
PCT Pub. Date: Apr. 30, 2009

(65) Prior Publication Data
US 2010/0312532 A1    Dec. 9, 2010

(30) Foreign Application Priority Data

Oct. 22, 2007 (FR) .................................. 07 58465

(51) Int. Cl.
*G01D 18/00* (2006.01)
(52) U.S. Cl.
USPC ...................................................... 250/252.1

(58) Field of Classification Search
USPC ........................................ 250/252.1; 703/2, 6
See application file for complete search history.

(56) References Cited

U.S. PATENT DOCUMENTS

| | | | |
|---|---|---|---|
| 2,740,899 A * | 4/1956 | Cummings | 356/24 |
| 6,795,801 B1 * | 9/2004 | Watkins et al. | 703/6 |
| 7,233,888 B2 * | 6/2007 | Chiang et al. | 703/6 |
| 8,145,459 B2 * | 3/2012 | Holland | 703/5 |

OTHER PUBLICATIONS

International Search Report for PCT/EP2008/064093 dated Mar. 17, 2009.
French Preliminary Search Report for French Application No. 0758465 dated Aug. 5, 2008.
Database Inspec [Online] The Institution of Electrical Engineers, Stevenage, GB; Yoon Hyuk Kim et al., "Use of Simulation Technology for Prediction of Radiation Dose in Nuclear Power Plant," XP002491056, Computational and Information Science, First International Symposium, CIS 2004, Proceedings Dec. 16-18, 2004, pp. 413-418.

(Continued)

*Primary Examiner* — David Porta
*Assistant Examiner* — Edwin Gunberg
(74) *Attorney, Agent, or Firm* — Nixon Peabody LLP

(57) ABSTRACT

A method for determining a radiation dose emitted by a source of fissile material in an installation comprising a set of walls perpendicular to a horizontal plane, characterized in that it comprises the determination from descriptive geometrical data of the installation, of intersection points between a calculation line and characteristic lines formed from a set of characteristic planes perpendicular to the horizontal plane and each containing a point source representative of the source and at least one junction edge between two walls perpendicular to the source plane.

7 Claims, 6 Drawing Sheets

(56) References Cited

OTHER PUBLICATIONS

Database Compendex [Online] Engineering Information, Inc., New York, NY, US; (Jan. 1, 2003), M. Yu Orlov, et al., "Monte-Carlo Calculation of Gamma Dose Distribution Inside a Building Wall (BW) and in Air," XP002491057, Atomic Energy, vol. 94, No. 6.

J.P. Sephton, et al., "Dose Mapping of a $^{20}$Co Industrial Irradiation Plant Using an Electronic Data Recording System, Static Measurements and Mathematical Modelling," Radiation Physics and Chemistry, Elsevicer Science Publishers BV., Amsterdam, NL, vol. 76, No. 11-12, Sep. 19, 2007, pp. 1820-1825, XP022249602, ISSN: 0969-806X.

* cited by examiner

METHOD FOR DETERMINING A DOSE OF RADIATION AND METHOD FOR DETERMINING AN ASSOCIATED ISODOSE CURVE

CROSS REFERENCE TO RELATED APPLICATIONS OR PRIORITY CLAIM

This application is a national phase of International Application No. PCT/EP2008/064093, entitled, "Method For Determining A Radiation Dose And Method For Determining An Associated Isodose Curve", which was filed on Oct. 20, 2008, and which claims priority of French Patent Application No. 07 58465, filed Oct. 22, 2007.

TECHNICAL FIELD AND PRIOR ART

The invention relates to a method for determining a dose of radiation as well as to a method for determining an isodose curve from doses determined by the method of the invention. Isodose curves for a given radiation are fictitious lines or surfaces at which a dose of radiation is substantially constant. In the following of the description, the term of <<radiation>> will be understood as gamma radiation, neutron emission or alpha particle emission.

Installations which contain fissile material have a risk of a criticality accident in spite of all the arrangements applied for limiting this risk. The consequences of a criticality accident are i.a. the risk of significant external exposure to emitted radiations and the risk of internal exposure by dispersion of radioactive products in the installation and/or in the environment. The invention applies to the management of the external exposure risk.

When a criticality accident occurs in an installation, it is important for reasons of security, to determine how the harmful radiations resulting from the accident are distributed. According to the known art, the doses of radiation are calculated manually, with abaci. These calculations with abaci are carried out in horizontal planes of the installation. If the calculations in the plane of the source (the horizontal plane of the installation which contains the source emitting harmful radiations) lead to a good description of the distribution of the doses of radiation, the calculations in planes parallel to the plane of the source lead to a more complex description of this distribution. Moreover, because of the manual nature of the calculations, risks of error are not negligible and the calculation times may be long.

The invention does not have these drawbacks.

DISCUSSION OF THE INVENTION

Indeed, the invention relates to a method for determining a dose of radiation emitted by a source of fissile material in an installation characterized in that it comprises the following steps:
- determining a number of fissions which occur, as a function of time, in the fissile material of the source,
- determining attenuation coefficients of materials which form the vertical walls and floors of the installation, and more generally of any screen likely to be placed on the trajectory of the emitted radiation,
- determining, from descriptive geometrical data of the installation, between a source plane substantially perpendicular to the vertical walls of the installation and which contains a point source representative of the source of radiation and a viewing plane parallel to the source plane, a set of characteristic planes parallel to the source plane and each containing the point source and at least one junction edge between two vertical walls of the installation;
- angularly scanning the characteristic planes around an axis perpendicular to the source plane and passing through the point source in order to define at least one calculation plane;
- determining, for the calculation plane, a set of characteristic lines, each characteristic line passing through the point source and through at least one point located at the junction of two junction edges;
- on a calculation line located at the intersection of the viewing plane and of the calculation plane, determining positions of intersection points between the calculation line and the characteristic lines;
- among the intersection points present on the calculation line, selecting intersection points $\Delta_j$ located in open air zones of the installation;
- calculating the dose of radiation $d(\Delta_j)$ present at each point $\Delta_j$, from the number of fissions versus time, from a distance which separates the point source from the $\Delta_j$ point and from attenuation coefficients of the constitutive materials of the vertical walls and/or of the floors and/or of any screen separating the point source from the point $\Delta_j$.

The invention also relates to a method for determining an isodose curve of radiation emitted by a source of fissile material in an installation, characterized in that it successively comprises:
- a method for determining a dose according to the invention, and
- a comparison of the doses $d(\Delta_j)$ determined by the method of the invention with predetermined dose intervals such that:
  if two calculated doses $d(\Delta_j)$ and $d(\Delta_{j+1})$ for two consecutive selected intersection points $\Delta_j$ and $\Delta_{j+1}$ belong to a same interval of doses, a same appurtenance zone is allotted between the two calculated points; and
  otherwise, one or more points $\Delta_k$ are sought by dichotomy, for which the dose $d(\Delta_k)$ is a dose interval limit, a same appurtenance zone being allotted between two consecutive points belonging to the same interval of doses,
- a formation of the isodose curve along the calculation line, depending on the appurtenance zones allotted to the calculated doses of radiation.

Upon designing an installation which has to contain fissile material, by applying the method of the invention, it is advantageously possible to carry out an analysis of the consequences of a possible future criticality accident in order to:
- define the evacuation paths of the installation,
- determine grouping points in the installation,
- position probes for detecting a criticality accident,
- mark out the zones with a risk of external exposure in the area around the installation, if the latter exist.

When a criticality accident occurs in an installation, with the method of the invention, it is advantageously possible to carry out in real time:
- an evaluation of the potential external exposure risks of workers located in the installation or in proximity to the latter,
- a placement of means or a setting up of procedures required for managing the crisis at the installation complementarily to the actions related to the emergency plan.

The methods of the invention are preferentially applied by a computer.

SHORT DESCRIPTION OF THE DRAWINGS

Other features and advantages of the invention will become apparent upon reading a preferential embodiment described with reference to the appended figures, wherein:

FIG. 1 symbolically illustrates an exemplary installation containing fissile material in which a criticality accident may occur;

In all the figures, the same marks designate the same elements.

DETAILED DISCUSSION OF PARTICULAR EMBODIMENTS

Figure 1:
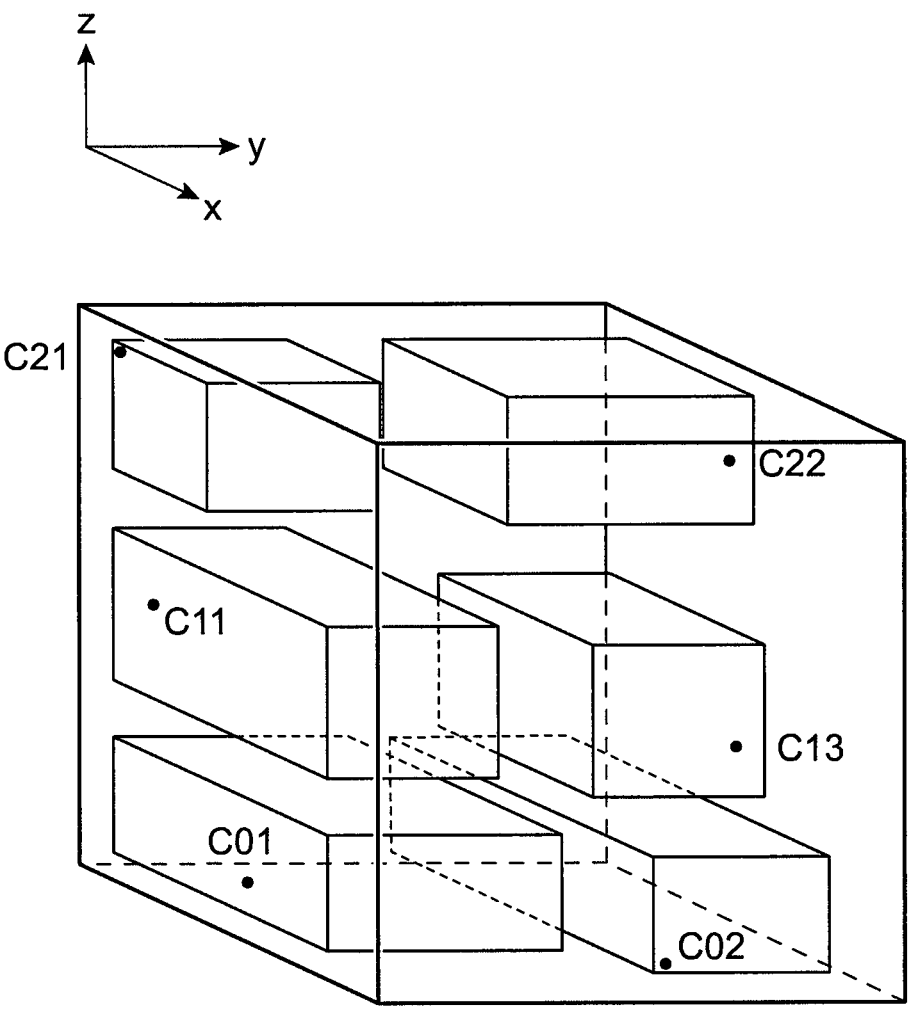

FIG. 1 symbolically illustrates an exemplary installation in which a criticality accident may occur.

The installation for example consists of a building of several storeys, each storey comprising several rooms. Different measurement sensors $C_{nm}$ are distributed in the different rooms of the installation. The sensors $C_{nm}$ are intended, in the case of an actual criticality accident, for carrying out radiation measurements which allow identification of the source emitting harmful radiations. The sensors $C_{nm}$ are for example ionization chambers, proportional sensors, etc. The installation is located in a direct reference system (x, y, z) such that the z axis is the vertical axis along which is defined the height of the installation and the plane (x, y) is a horizontal plane for the installation.

Figure 2:
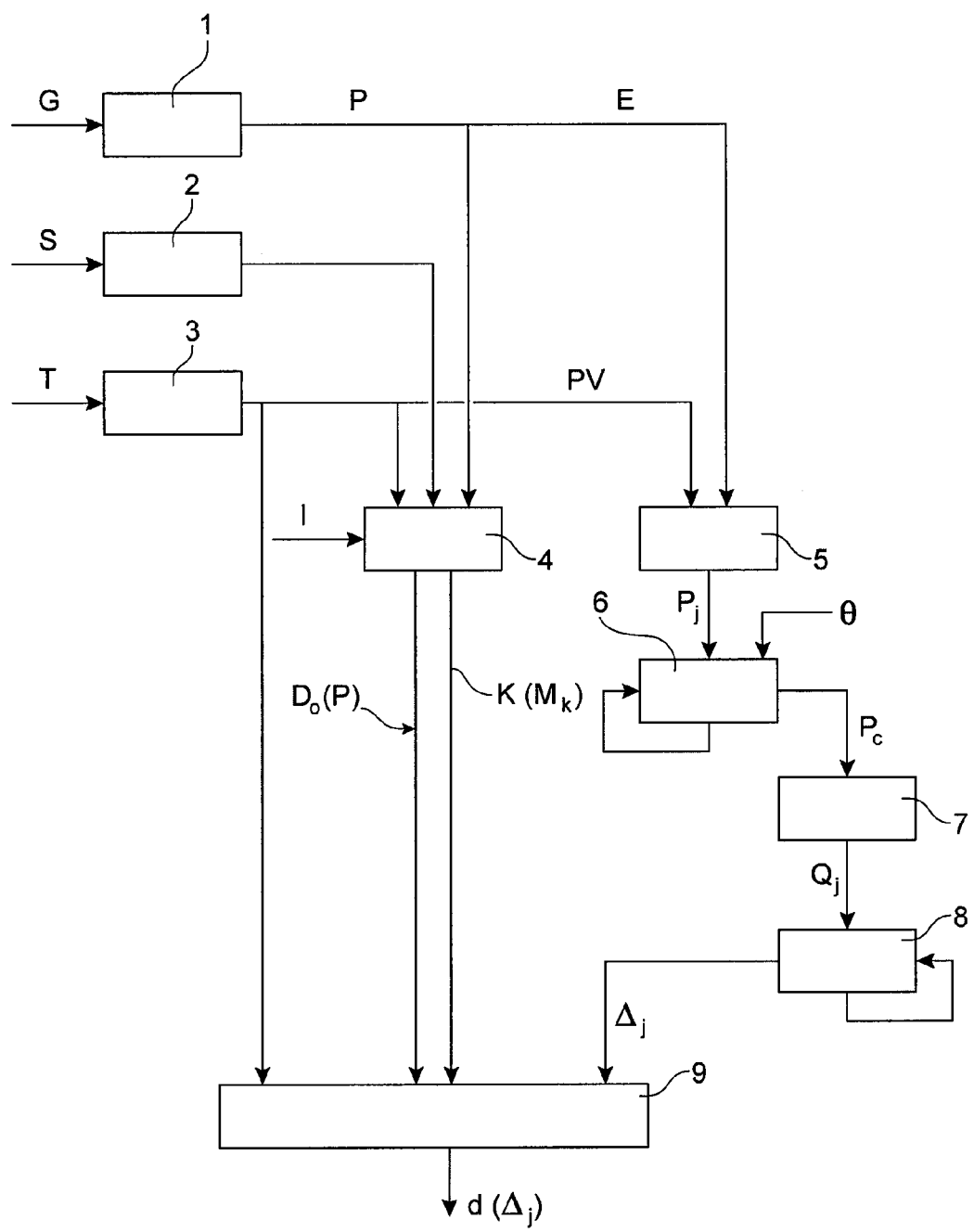
FIG. 2 illustrates a block diagram of the dose determination method of the invention.

FIG. 2 illustrates a block diagram of the different steps of the dose determination method of the invention (steps 1-9).

The method of the invention begins by three steps for reading data, i.e. a step 1 for reading geometrical data of the installation, a step 2 for reading source data, and a step 3 for reading layout data. The order in which the reading steps 1-3 are carried out is immaterial, these three steps may be carried out simultaneously.

The geometrical data of the installation G read in step 1 are representative of the bulk configuration of the building (the different rooms of the building, the envelope of the building) and of the geometrical configuration of the protective screens which are present in the building.

The source data S read in step 2 are data relating to the source which emits the radiations. They consist of the number of fissions which occur, as a function of time, at the accident location, of geometrical data which describe the geometry of the tank in which the accident has occurred (point source or bulk source) and of medium data which characterize the medium in which the accident occurred (liquid medium, powder, metal). These data are obtained from radiation measurements delivered by the sensors which have detected the criticality accident on the one hand, and from pre-recorded information relating to the different products present in the installation on the other hand.

The layout data T comprise:
threshold data which define predetermined dose intervals in which the calculated doses will be distributed, and
geometrical data relating to the points of the installation where it is desired that the doses be calculated (viewing plane(s), particular zone(s) or particular point(s) of the installation).

The reading steps 1, 2 and 3 are followed by a step 4 for evaluating attenuation coefficients $K(M_k)$ (k=1, 2, ..., n) of the different materials $M_k$ (k=1, 2, ..., n) which make up the installation and theoretical data $D_O(P)$ which represent the radiation doses which would be present, in the absence of any wall or screen, in different points P of the installation. The step 4 for calculating the $K(M_k)$ coefficients and the $D_O(P)$ data is carried out from G and S data, from T data and from internal data I which comprise an attenuation coefficient mathematical model for each type of material. Preferentially, an attenuation coefficient appears in the form of a polynomial equation. As a non-limiting example, an attenuation coefficient $K(M_k)$ of a material $M_k$ crossed by radiation is written as:

$$K(M_k) = aX + bY + cXY + dX^2 + eY^2 + fZ + gW$$

The coefficients a, b, c, d, e, f and g are known set value parameters which are characteristic of the material $M_k$ for which an evaluation of the attenuation coefficients is sought. The quantities X, Y, Z are characteristic variables of the radiation source and the quantity W is a variable which represents the thickness of the crossed material $M_k$ (W will be specified later on). More specifically, the variable X depends on the type of source (liquid, powder, metal), the variable Y depends on the volume of the source and the variable Z depends on the time which has elapsed between the accident and the moment when the coefficient is determined. The coefficients a, b, c, d, e, f and g are data which belong to the set of data I mentioned earlier. The data X, Y, Z are data which belong to the set of data S and the datum W is calculated from the geometrical data G and from the layout data T.

For a given source type, the quantity $aX + bY + cXY + dX^2 + eY^2 + fZ$ is a constant term $K_O$. Thus, the quantity $K(M_k)$ is expressed as a function of the sole variable W, i.e.:

$$K(M_k) = g \times W + K_0$$

More generally, the internal data I in addition to the mathematical equations of the attenuation coefficients and the coefficients a, b, c, d, e, f, g, comprise the following data:
units in which it is desired that the doses be calculated (dose in air Gy or dose equivalent Sv), and
the conditions of the calculation of the attenuation coefficients (coefficients for distance correction between the source and the calculation points).

Figure 4:
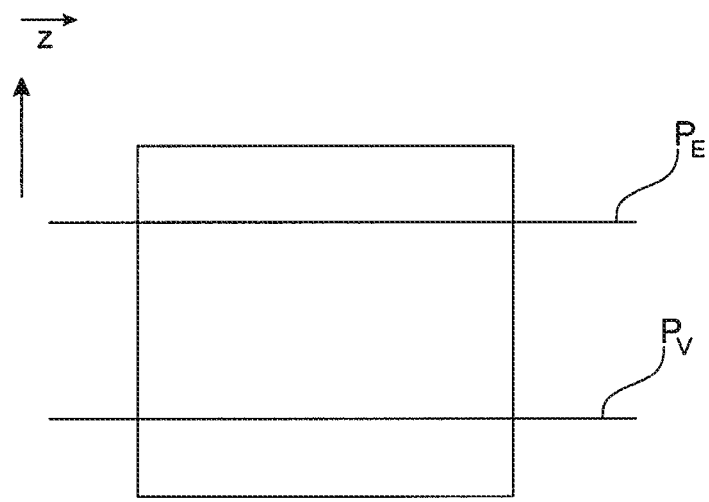
FIG. 4 illustrates a sectional view of a volume of the installation in which doses are calculated according to the method of the invention.
Figure 5:
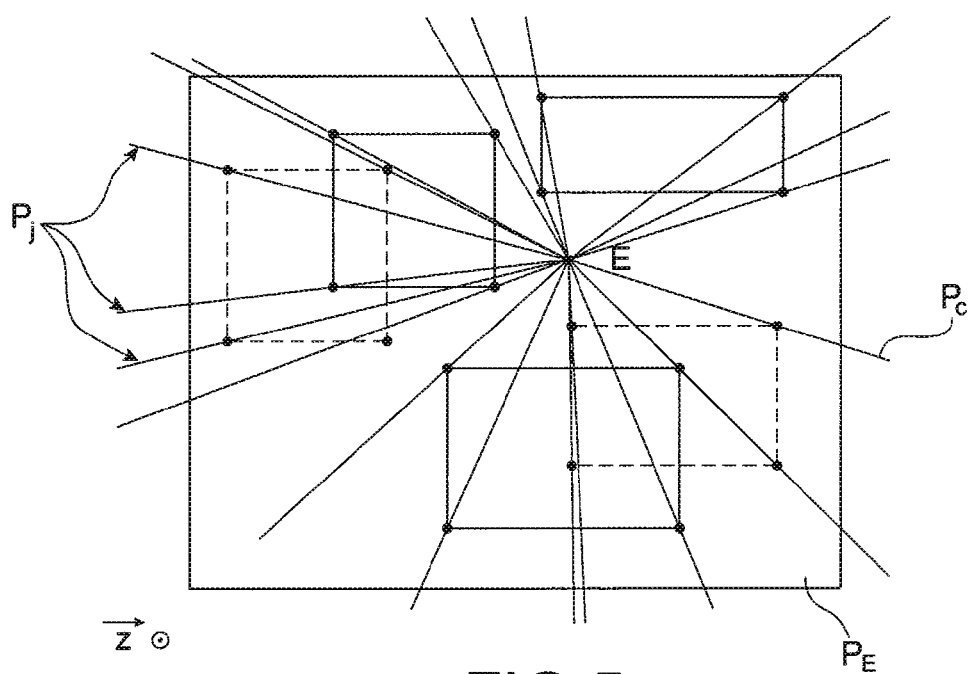
FIG. 5 illustrates a set of characteristic planes useful for dose calculation according to the method of the invention.

In parallel with the calculation step 4, four elementary calculation steps 5, 6, 7 and 8 are carried out. Step 5 is a step for determining characteristic planes useful for dose calculation. As a non-limiting example, a set of characteristic planes $P_j$ is illustrated in FIG. 5. FIG. 5 represents a sectional view of the installation along the horizontal plane $P_E$ which contains the point E to which the source emitting the harmful radiations is assimilated. The characteristic planes are constructed between the plane $P_E$ and a viewing plane $P_V$. The viewing plane $P_V$ is a plane parallel to the plane $P_E$ in which the doses are calculated (cf. FIG. 4). The viewing plane $P_V$ is a datum set by the layout data T. Each characteristic plane $P_j$ is a vertical plane, i.e. a plane perpendicular to the horizontal planes $P_E$ and $P_V$, which contains the point E to which the source emitting the harmful radiations is assimilated and at least one junction edge between two vertical walls comprised between the planes $P_E$ and $P_V$. The set of all the planes which may be constructed according to the rule specified above, forms the characteristic planes of the invention. Accordingly, all the edges of all the rooms comprised between $P_E$ and $P_V$ and which are perpendicular to the planes $P_E$ and $P_V$ are affected. The whole of the characteristic planes is selected from the geometrical data G.

In step 6 of the method of the invention, a scan is then carried out between the characteristic planes $P_j$ in order to determine different calculation planes $P_C$. The calculation planes $P_C$ are then obtained by rotation, with an angular pitch θ of the characteristic planes $P_j$ around an axis $Z_p$ perpendicular to the planes $P_E$ and $P_V$ and passing through the point source E. Each calculation plane $P_C$ is a plane in which a dose calculation is carried out, along a given direction as this will now be described, as a non-limiting example, in a particular calculation plane, with reference to FIG. 6.

Figure 6:
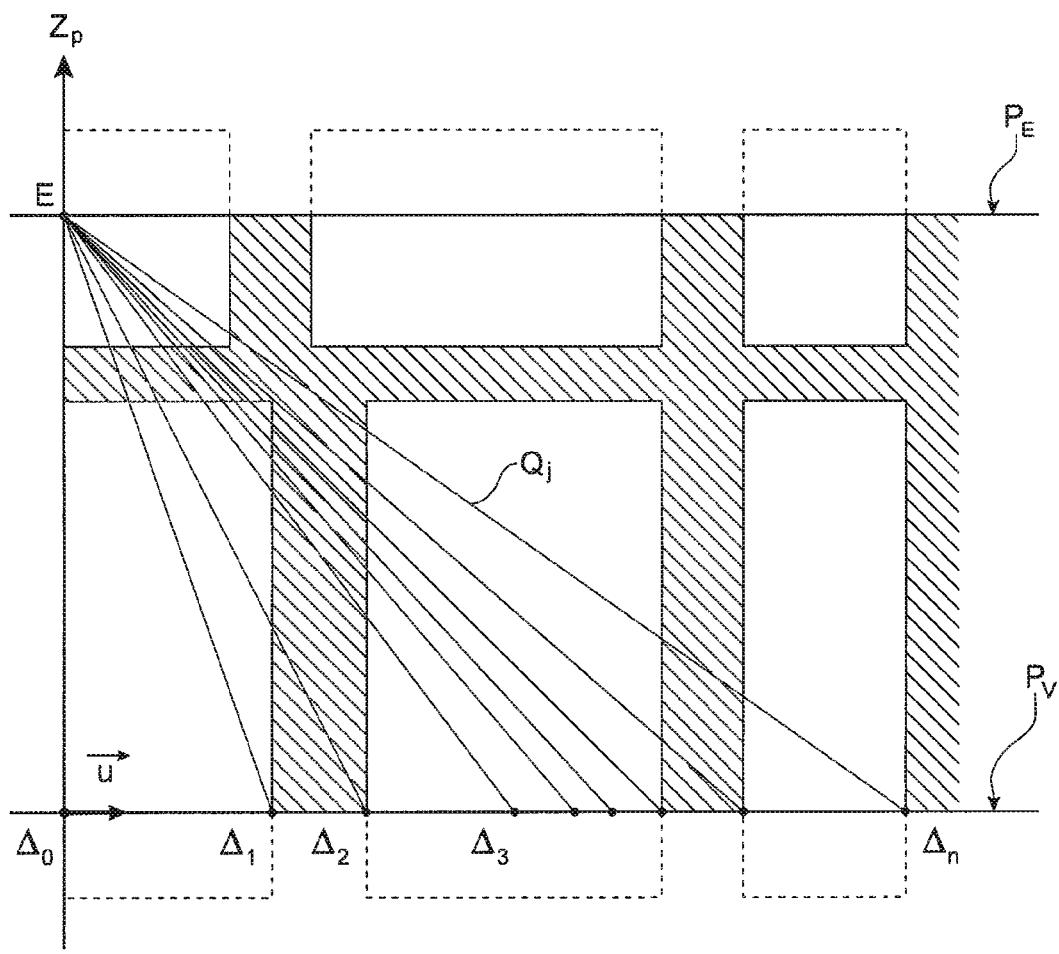
FIG. 6 illustrates a set of characteristic lines useful for the dose calculation according to the method of the invention.

To step 6 for determining calculation planes succeeds a step 7 for determining characteristic lines $Q_j$ in each calculation plane. For a given calculation plane, a characteristic line $Q_j$ passes through the point source E and through at least one point located at the junction of two edges located in the calculation plane. All the lines which may be constructed according to the rule specified above form the set of the characteristic lines $Q_j$ of the invention for the relevant calculation plane. By design, a calculation plane $P_C$ is divided into two half-planes symmetrical to each other with respect to the vertical axis $Z_p$. The set of the characteristic lines relative to a calculation plane is therefore divided into two half-sets of characteristic lines. FIG. 6 illustrates, as a non-limiting example, a half-set of characteristic lines for the calculation plane $P_C$ of FIG. 5. The calculation half-plane cuts the viewing plane $P_V$ along a line D with a unit vector $\vec{u}$. A set of characteristic points $\Delta_j$ belonging to the line D is then determined (step 8 of the method of the invention). A characteristic point $\Delta_j$ is obtained by the intersection of a characteristic line $Q_j$ and of the line D. FIG. 6 illustrates as an example a succession of characteristic points $\Delta_0, \Delta_1, \Delta_2, \ldots, \Delta_n$. The characteristic points $\Delta_j$ have a known geometrical position in the installation. The structure of the installation between the point source E and each of the points $\Delta_j$ is also known (cf. FIG. 6). Thus, from data calculated previously $D_0(P)$ and $K(M_k)$, from the known position of the points $\Delta_j$ relatively to the emitting source E and from the known structure of the installation between the source E and the points $\Delta_j$, the radiation dose $d(\Delta_j)$ present in each point $\Delta_j$ may be calculated (step 9 of the method of the invention).

The calculation line D consists of open air zones and of wall or screen zones. The calculation of the doses is only of an actual interest in the open air zones. The calculation of the doses $d(\Delta_j)$ is therefore only carried out preferentially for the points $\Delta_j$ located in the open air zones.

The calculation of the dose in a point $_j$ is obtained by the following equation:

$$d(\Delta_j) = D_0(P) \times C_d \times \sum_k K(M_k)$$

$D_0(P)$ is the calculated dose, in the absence of walls and of screens, in a predetermined arbitrary point P located on the radiation path, at a distance $l_0$ from the point source E (in the case of a bulk source, the point E is the centre of the volume of the source), $C_d$ is a distance correction coefficient such that:

$$C_d = \frac{l_0^2}{l^2},$$

wherein $l_0$ is the distance mentioned earlier and l is the distance from the point source E to the point $\Delta_j$, and $K(M_k)$ is the attenuation coefficient of the material $M_k$ mentioned below.

The attenuation coefficient $K(M_k)$ will now be specified. As mentioned earlier, the attenuation coefficient of a material $M_k$ crossed by the radiation is written as:

$$K(M_k) = g \times W + K_0$$

wherein the quantity W represents the distance covered by the radiation through the material $M_k$. Preferentially, the quantity W is defined as a function of the angle α formed by the direction of the radiation which crosses the wall or the screen of material $M_k$ with the normal to the plane of this wall or this screen:

For an angle α comprised between 0° and a predetermined limiting value $\alpha_{lim}$ ($0 < \alpha_{lim} < \pi/2$), W is the actual thickness of the crossed material, and For an angle α comprised between the predetermined limiting value $\alpha_{lim}$ and $\pi/2$, W is the value $W_{lim}$ of the thickness of the wall or screen which corresponds to the angle $\alpha_{lim}$.

The quantity $\alpha_{lim}$ is selected so as not to underestimate the dose $d(_j)$ for large angles. This quantity $_{lim}$ varies with the type of radiation.

Figure 3:
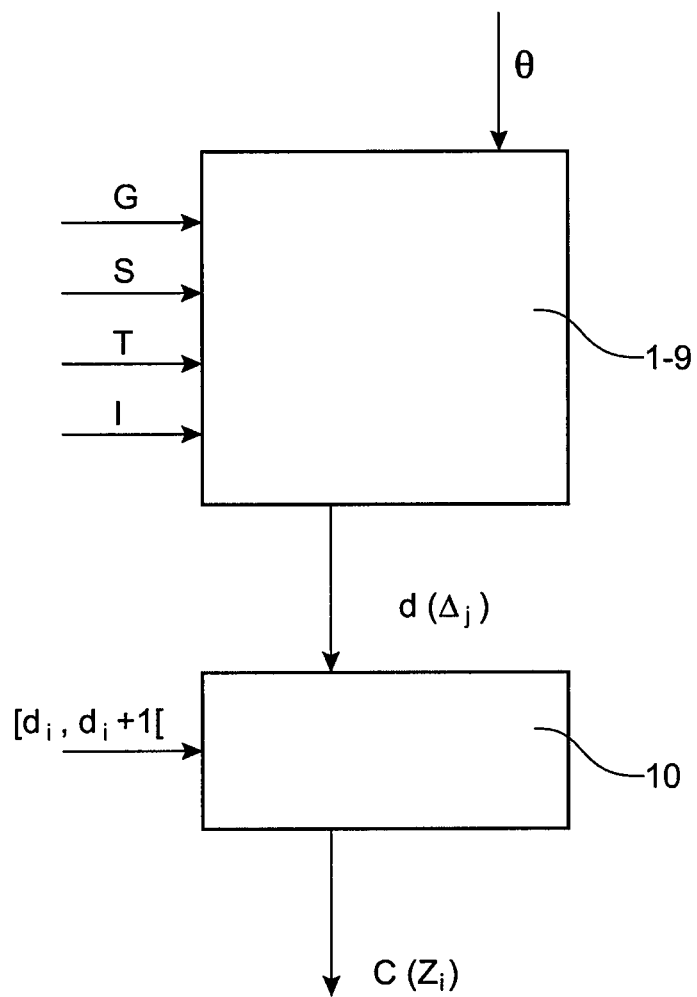
FIG. 3 illustrates a block diagram of the isodose curve determination method of the invention.

FIG. 3 illustrates a block diagram of the method for determining isodose curves of the invention. The isodose curve determination method repeats the whole of the steps 1-9 described above and an additional step 10 for distributing the calculated doses in dose intervals of predetermined values.

An example of such a distribution will now be described, wherein the doses $d(\Delta_j)$ are distributed in n intervals of doses [di, di+1[ (i=1, 2, . . . , n).

The distribution of the calculated doses in the different dose intervals is carried out in this way:

if the doses $d(\Delta_j)$ and $d(\Delta_{j+1})$ calculated for two successive characteristic points and $\Delta_{j+1}$ of a same open air zone belong to a same interval [di, di+1[, then a same zone $Z_i$ is allotted between these points;

otherwise, the dose $d((\Delta_j + \Delta_{j+1})/2)$ at the middle point $(\Delta_j + \Delta_{j+1})/2$ is calculated and one or more points $\Delta_k$ are sought by dichotomy, for which the dose $d(\Delta_k)$ is a dose interval limit, a same appurtenance zone being allotted between two consecutive points belonging to the same dose interval.

Figure 7:
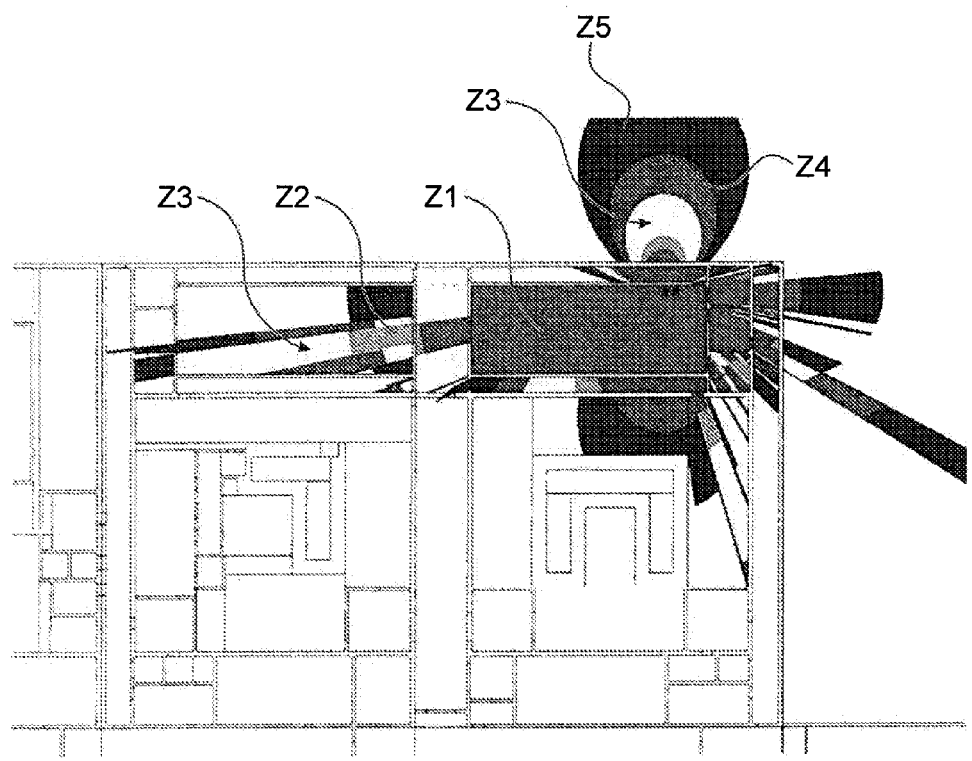
FIG. 7 illustrates an exemplary distribution of obtained isodose curves, in a viewing plane, according to the method of the invention.

It is then possible to obtain, for a same calculation line D, a curve of isodoses $C(Z_i)$ as a function of different zones $Z_i$ (step 10 of the method). Obtained for the whole of the calculation lines, i.e. for the whole of the calculation planes, the isodose curves $C(Z_i)$ form a surface of isodoses in the whole of the viewing plane $P_V$. As a non-limiting example, FIG. 7 illustrates a distribution of the calculated doses in five zones Z1-Z5.

In the particular case when the viewing plane is the horizontal plane $P_E$ which contains the point source E, all the walls and screens are crossed perpendicularly to their surface (α=0). The values of the attenuation coefficients are then constant values K. The calculations are thus simplified very advantageously.

If the doses $d(_j)$ and $d(_{j+1})$ do not belong to the same interval [di, di+1[, the distance l which separates the point source E from a point $_j$ where the radiation dose d$(_j)$ corresponds to an interval limit is simply expressed by the equation:

$$1 = l_0 \times \sqrt{\frac{D_0(P)}{d_k} \times \sum_k K(M_k)}$$

The invention claimed is:

1. A method for determining a radiation dose emitted in a real or simulated way by a source of fissile material in an installation, characterized in that it comprises the following steps:
   using one or more dosage sensors distributed in the installation to obtain measurements indicative of fission in the installation,
   using a computer to:
      determine the number of fissions which occur, versus time, in the fissile material of the source,
      determine attenuation coefficients of the materials which form the vertical walls and the floors of the installation and more generally, of any screen which may be placed on the trajectory of the emitted radiation,
      determine from descriptive geometrical data of the installation between a source plane (P$_E$) substantially perpendicular to the vertical walls of the installation and which contains a point source (E) representative of the radiation source and a viewing plane (P$_V$) parallel to the source plane, a set of characteristic planes (P$_j$) perpendicular to the source plane and each containing the point source (E) and at least one junction edge between two vertical walls of the installation;
      angularly scan ($\theta$) the characteristic planes around an axis (Z$_p$) perpendicular to the source plane and passing through the point source (E) in order to define at least one calculation plane (P$_C$);
      determine for the calculation plane, a set of characteristic lines (Q$_j$), each characteristic line passing through the point source (E) and through at least one point located at the junction of two junction edges;
      on a calculation line (D) located at the intersection of the viewing plane and of the calculation plane, determine positions of intersection points between the calculation line and the characteristic lines;
      among the intersection points present on the calculation line, selecting intersection points $\Delta_j$ located in open air zones of the installation;
      calculate the radiation dose d($\Delta_j$) present in each point $\Delta_j$, from the number of fissions versus time, from a distance which separates the point source (E) from the point $\Delta_j$ and from attenuation coefficients of the constitutive materials of the verticals walls and/or floors and/or of any screen separating the point source (E) from the point $\Delta_j$.

2. A method according to claim 1, further comprising determining isodose curves of radiation emitted in a real or simulated way, by a source of fissile material in an installation, characterized in that it successively comprises:
   a comparison, by means of a computer, of the doses d($\Delta_j$) determined by the method of claim 1 with predetermined dose intervals such that:
      if two calculated doses d($\Delta_j$) and d($\Delta_{j+1}$) for two consecutive selected intersection points $\Delta_j$ and $\Delta_{j+1}$ belong to a same interval of doses, a same appurtenance zone (Z$_i$) is allotted between the two calculated points; and
      otherwise, a radiation dose d(($\Delta_j$+$\Delta_{j+1}$)/2) is calculated at the middle point located between the two consecutive points $\Delta_j$ and $\Delta_{j+1}$ and one or more points $\Delta_k$ are sought by dichotomy, for which the dose ($\Delta_k$) is a dose interval limit, a same appurtenance zone being allotted between both consecutive points belonging to the same dose interval,
   a formation of the isodose curve along the calculation line, as a function of the appurtenance zones allotted to the calculated radiation doses.

3. The method according to claim 2, wherein the angular scan is carried out over 360 degrees so that a set of isodose curves established along a set of calculation lines are grouped in order to form a representation of the isodoses in the whole of the viewing plane.

4. The method according to claim 1, wherein the radiation dose present at the selected intersection point is given by the equation:

$$d(\Delta_j) = D_0(P) \times C_d \times \sum_k K(M_k),$$

wherein
   $D_0(P)$ is the calculated dose, in the absence of any screen and of screens, in a predetermined arbitrary point (P) located on the path of the radiation which propagates between the point source (E) and the point $\Delta_j$ at a distance $l_0$ from the point source (E),
   $C_d$ is a distance correction coefficient such that:

$$C_d = \frac{l_0^2}{l^2},$$

wherein $l_0$ is the distance mentioned earlier and $l$ is the distance from the point source (E) to the point $\Delta_j$, and
   $K(M_k)$ is the calculated attenuation coefficient of a material $M_k$ crossed by radiation which propagates between the point source (E) and the point $\Delta_j$.

5. The method according to claim 4, wherein the attenuation coefficient $K(M_k)$ is given by the formula:

$K(M_k) = g \times W + K_0$, wherein

W is a quantity which represents the crossed thickness of the material $M_k$,
   g is a known coefficient characteristic of the material $M_k$,
   $K_0$ is a known term which depends on the radiation source and on the material $M_k$.

6. The method according to claim 5, wherein the quantity W is defined as a function of the angle $\alpha$ formed by the direction of the radiation with the normal to the vertical wall of material $M_k$ so that:
   for an angle $\alpha$ comprised between 0° and a predetermined limiting value $\alpha_{lim}$ (0<$\alpha_{lim}$<$\pi$/2), W is the actual thickness of the crossed material, and
   for an angle $\alpha$ comprised between the predetermined limiting value $\alpha_{lim}$, and $\pi$/2, W is the thickness of the material crossed by radiation, the direction of which forms the angle $\alpha_{lim}$ with the normal to the vertical wall.

7. The method according to claim 1, wherein the emitted radiation is gamma radiation or neutron emission or alpha particle emission.

* * * * *

UNITED STATES PATENT AND TRADEMARK OFFICE
CERTIFICATE OF CORRECTION

| | | |
|---|---|---|
| PATENT NO. | : | 8,536,515 B2 |
| APPLICATION NO. | : | 12/739141 |
| DATED | : | September 17, 2013 |
| INVENTOR(S) | : | Masse et al. |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 535 days.

Signed and Sealed this

Fifteenth Day of September, 2015

Michelle K. Lee
*Director of the United States Patent and Trademark Office*